US010081390B1

(12) United States Patent
Anderson et al.

(10) Patent No.: US 10,081,390 B1
(45) Date of Patent: Sep. 25, 2018

(54) VEHICLE PARKING ASSISTANCE BASED ON CUSTOMIZED EGRESS REQUIREMENTS

(71) Applicant: International Business Machines Corporation, Armonk, NY (US)

(72) Inventors: Evelyn R. Anderson, Houston, TX (US); Michael Bender, Rye Brook, NY (US); Rhonda L. Childress, Austin, TX (US); Ea-Ee Jan, Ardsley, NY (US)

(73) Assignee: International Business Machines Corporation, Armonk, NY (US)

( * ) Notice: Subject to any disclaimer, the term of this patent is extended or adjusted under 35 U.S.C. 154(b) by 14 days.

(21) Appl. No.: 15/594,776

(22) Filed: May 15, 2017

(51) Int. Cl.
B62D 15/02 (2006.01)
G08G 1/16 (2006.01)
G08G 1/14 (2006.01)
G08G 1/133 (2006.01)

(52) U.S. Cl.
CPC ....... B62D 15/028 (2013.01); B62D 15/0285 (2013.01); G08G 1/133 (2013.01); G08G 1/143 (2013.01); G08G 1/168 (2013.01)

(58) Field of Classification Search
CPC .. B62D 15/028; B62D 15/0285; G08G 1/133; G08G 1/143; G08G 1/168
USPC ........................................................ 340/436
See application file for complete search history.

(56) References Cited

U.S. PATENT DOCUMENTS

| 2013/0154792 | A1* | 6/2013 | Reed | E05F 15/43 340/3.1 |
| 2014/0043155 | A1* | 2/2014 | Shaw | B60Q 9/00 340/457 |
| 2016/0055749 | A1 | 2/2016 | Nicoll et al. | |
| 2016/0208537 | A1* | 7/2016 | Senguttuvan | B60W 50/0098 |
| 2017/0236418 | A1* | 8/2017 | Bostick | G08G 1/143 340/932.2 |
| 2018/0001930 | A1* | 1/2018 | Sham | B62D 15/0285 |

FOREIGN PATENT DOCUMENTS

| DE | 102015205013 | | 11/2015 | |
| EP | 3081731 | | 10/2016 | |
| EP | 3081731 | A1 * | 10/2016 | ......... B62D 15/0285 |
| WO | WO2016109076 | | 7/2016 | |

* cited by examiner

Primary Examiner — Hirdepal Singh
(74) Attorney, Agent, or Firm — Schmeiser, Olsen & Watts, LLP; Robert Shatto

(57) ABSTRACT

A parking assistance management system and method for assisting a parking of a vehicle based on a customized egress requirements is provided. The method includes the steps of identifying a user entering a vehicle, calculating a minimum egress space of the user, required for an egress of the user from the vehicle, detecting a parking space proximate at least one object, determining a viability of the parking space based on the minimum egress space, verifying that a distance between the vehicle and the at least one object is greater than the minimum egress space, when the vehicle is parked in the parking space, and broadcasting the minimum egress space to be received by other vehicles.

17 Claims, 13 Drawing Sheets

US 10,081,390 B1

VEHICLE PARKING ASSISTANCE BASED ON CUSTOMIZED EGRESS REQUIREMENTS

BACKGROUND

The present invention relates to a parking assistance system, and more specifically to embodiments of parking assistance based on customized egress requirements.

When parking a vehicle, sufficient room must be left on one or more sides of the vehicle for occupants to exit and re-enter the vehicle, without causing damage to the vehicle or discomfort to the occupants.

SUMMARY

An embodiment of the present invention relates to a method, and associated computer system and computer program product, for assisting a parking of a vehicle based on a customized egress requirements. A processor of a computing system identifies a user entering a vehicle. A minimum egress space of the user, required for an egress of the user from the vehicle is calculated. A parking space proximate at least one object is detected. A viability of the parking space is determined based on the minimum egress space is determined. A distance between the vehicle and the at least one object is verified to be greater than the minimum egress space, when the vehicle is parked in the parking space. The minimum egress space is broadcasted to be received by other vehicles.

DETAILED DESCRIPTION

Figure 1:
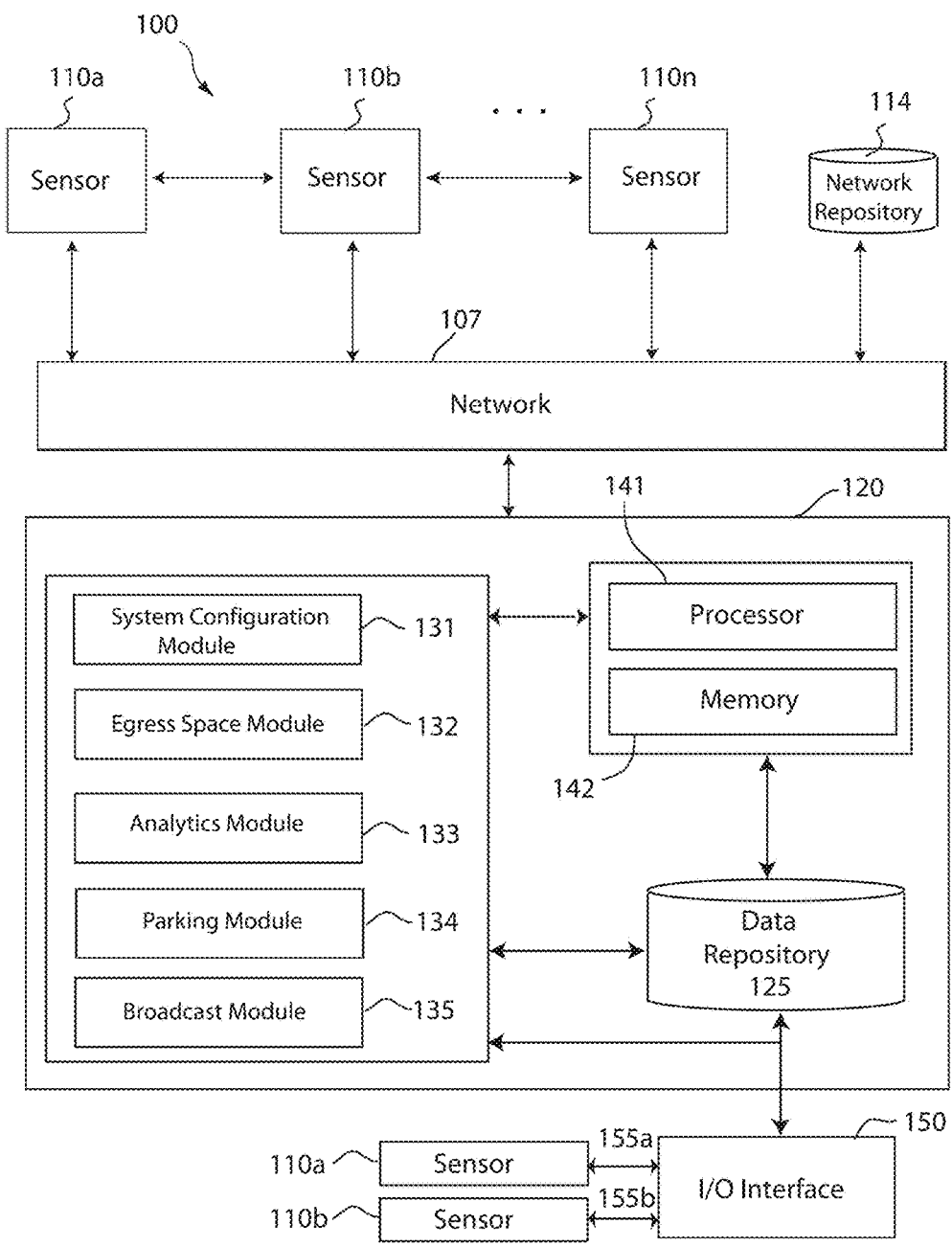
FIG. 1 depicts a block diagram of a parking assistance system, in accordance with embodiments of the present invention.

Referring to the drawings, FIG. 1 depicts a block diagram of a parking assistance system, in accordance with embodiments of the present invention. Embodiments of a parking assistance system 100 may determine whether a vehicle can optimally fit within a parking space accounting for a required egress space for one or more occupants to comfortably and conveniently exit and/or enter the vehicle. For instance, embodiments of the parking assistance system 100 may analyze a parking space that may be located between two objects, such as two parked cars, and determine whether the occupants of the vehicle can exit without damaging the vehicle or causing inconvenience or discomfort to the occupants, prior to parking the vehicle. If the parking space is determined to be a viable parking space, the parking assistance system 100 may provide steering instructions to the driver to ensure an optimal positioned within the parking space, or the vehicle may automatically drive (e.g. self-driving car) the vehicle into the parking space, at an optimal orientation within the parking space. If a particular parking space is determined to be non-viable, then the parking assistance system may recommend that the occupants exit the vehicle prior to parking, and a self-driving feature of the vehicle may automatically park the vehicle in the parking space. In other embodiments, the parking assistance system 100 may recommend that the passengers of the vehicle may exit before parking, while the driver remains to park the vehicle, potentially receiving precise steering instructions (e.g. left or right while approaching/entering the parking space) to help park the vehicle in an optimal position that will allow an ideal egress of the driver from the vehicle.

Embodiments of the parking assistance system 100 may include a computing system 120. Embodiments of the computing system 120 may be an onboard computing system of a vehicle, such as a car, a truck, a semi-truck, a motor vehicle, a self-driving vehicle, and the like. In other embodiments, the computing system 120 may be a server or remote computing system communicatively coupled to an onboard computing system of the vehicle, wherein the computing system 120 services requests and performs the functions of the parking assistance system 100.

Embodiment of parking assistance system 100 may comprise one or more sensors 110a, 110b, 110c, 110d, 110e, 110f, 110g, 110h . . . 110n (referred to collectively as "sensors 110") communicatively coupled to a computing system 120 via an I/O interface 150 and/or over a network 107. For instance, some or all of the sensors 110 may be connected via an I/O interface 150 to computer system 120. The number of sensors 110 connecting to computer system 120 via data bus lines 155a, 155b (referred to collectively as "data bus lines 155) and/or over network 107 may vary from embodiment to embodiment, depending on the number of sensors 110 present in the parking assistance system 100. The reference numbers with sub-letters and/or ellipses, for example describing sensors as 110a, 110b, 1100c, 100d, 110e, 110f, 110g, 110h . . . 110n or the data bus lines as 155a, 155b, may signify that the embodiments are not limited only to the amount of elements actually shown in the drawings, but rather, the ellipses between the letters and the $n^{th}$ element indicate a variable number of similar elements of a similar type. For instance, with regard to the sensors 110 depicted in FIG. 1, any number of a plurality of sensors 110 may be present including sensor 110a, sensor 110b, and a plurality of additional sensors up to the $n^{th}$ number of sensors 110n, wherein the variable "n" may represent the last element in a sequence of similar elements shown in the drawing.

As shown in FIG. 1, a number of sensors 110 may transmit data about the vehicle or the environment surrounding or proximate a vehicle (e.g. "vehicle data" and/or "environment data") received from the sensor 110 by connecting to computing system 120 via the data bus lines 155 to an I/O interface 150. An I/O interface 150 may refer to any communication process performed between the computer system 120 and the environment outside of the computer system 120, for example, the sensors 110. Input to the computing system 120 may refer to the signals or instructions sent to the computing system 120, for example the data collected by the sensors 110, while output may refer to the signals sent out from the computer system 120 to the sensors 110.

Some or all of the sensors 110 may transmit data about the vehicle or the environment surrounding or proximate the vehicle (e.g. "vehicle data" and/or "environment data") received from the sensor 110 and/or input device 111 by connecting to computing system 120 over the network 107. A network 107 may refer to a group of two or more computer systems linked together. Network 107 may be any type of computer network known by individuals skilled in the art. Examples of computer networks 107 may include a LAN, WAN, campus area networks (CAN), home area networks (HAN), metropolitan area networks (MAN), an enterprise network, cloud computing network (either physical or virtual) e.g. the Internet, a cellular communication network such as GSM or CDMA network or a mobile communications data network. The architecture of the computer network 107 may be a peer-to-peer network in some embodiments, wherein in other embodiments, the network 107 may be organized as a client/server architecture. In an exemplary embodiment, network 107 may be an Ethernet network of a vehicle.

In some embodiments, the network 107 may further comprise, in addition to the computer system 120, and sensors 110, a connection to one or more network accessible knowledge bases containing information of one or more users, network repositories 114 or other systems connected to the network 107 that may be considered nodes of the network 107. In some embodiments, where the computing system 120 or network repositories 114 allocate resources to be used by the other nodes of the network 107, the computer system 120 and network repository 114 may be referred to as servers.

The network repository 114 may be a data collection area on the network 107 which may back up and save all the data transmitted back and forth between the nodes of the network 107. For example, the network repository 114 may be a data center saving and cataloging vehicle data, environment data, or user/occupant data sent by one or more of the sensors 110 to generate both historical and predictive reports regarding a particular user or vehicle. In some embodiments, a data collection center housing the network repository 114 may include an analytic module capable of analyzing each piece of data being stored by the network repository 114. Further, the computer system 120 may be integrated with or as a part of the data collection center housing the network repository 114. In some alternative embodiments, the network repository 114 may be a local repository (not shown) that is connected to the computer system 120.

With continued reference to FIG. 1, embodiments of the computing system 120 may receive the vehicle data, environment data, and/or user data from one or more sensors 110 which may be positioned within a vehicle interior, on an exterior surface of the vehicle, on a vehicle, embedded into the vehicle, or in an environment shared by a user or a plurality of occupants of the vehicle, worn by the user(s), or otherwise disposed in a location that can result in obtaining vehicle data, environment data, and user data. In an exemplary embodiment, at least one sensor 110a may be positioned on a door of a vehicle, and another sensor 110b may be positioned on a door frame of the vehicle. Sensors 110 may be a sensor, an input device, or any input mechanism. For example, sensor 110 may be a biometric sensor, a wearable sensor, an environmental sensor, a camera, a camcorder, a microphone, a peripheral device, a computing device, a mobile computing device, such as a smartphone or tablet, facial recognition sensor, voice capture device, accelerometer, gyroscope, proximity sensors, ultrasonic sensors, light sensors, radar components, sonar sensors, lasers, automotive and transportation sensors, and the like. Further embodiments of sensors 110 not specifically listed herein may be utilized to collect data about the vehicle, occupants, driver, or conditions surrounding the vehicle environment.

Further embodiments of sensors 110 may include one or more input devices or input mechanisms, including one or more cameras positioned around one or more doors of the vehicle. The one or more cameras may capture image data or video data of a user or occupant entering the vehicle, including whether the user/occupant is carrying one or more items. The one or more cameras may also be used in conjunction with another type or sensor, such as a laser sensor or other sensor to capture and/or measure a door angle when the door is opened by the user/occupant. Further embodiments of sensors 110 may include a mobile computing device, such as a smartphone or tablet device, which may run various applications that contain data about the vehicle or users/occupants. For example, an owner of the vehicle may have a smartphone that may have various applications that may send user or vehicle data to the computing system 120. The mobile computing device as used as sensor may also utilize the device's camera, microphone, and other embedded sensors to send information to the computing system 120. Moreover, embodiments of sensors 110 may encompass other input mechanisms, such as a user computer that may send information to the computing system 120.

Furthermore, embodiments of the one or more sensors 110 may be in communication with each other. The sensors 110 may interact with each other for collecting comprehensive, accurate, timely, and organized data, and sending to computing system 120. A first sensor of the one or more sensors 110 may request help from another sensor of the one or more sensors 110 to confirm a door angle of an opened door or a data result from the first sensor. For example, a camera may communicatively interact with an accelerometer sensor to confirm a total distance that the vehicle door has been opened. Additionally, data received by the computing system 120 that is collected by a first sensor of the one or more sensors 110 may be dependent on another sensor of the one or more sensors 110. For instance, a camera sensor for measuring an overall size of the user/occupant entering the vehicle, with or without objects in tow, may rely on a proximity sensor located on a door frame of the vehicle to determine a correct buffer distance to be applied for calculating a minimum egress space for the user to exit the vehicle, with or without the objects in tow. Further, embodiments of the sensors 110 may be synchronized with each other to provide accurate and timely data in combination to the computing system 120. Any sensor may communicate with the other sensors. The interactive communication between the sensors 110 may modify, update, augment, bolster, confirm, reference, etc. data received and/or collected by the sensor, as well as improve the accuracy and efficiency of the data.

Referring still to FIG. 1, embodiments of the computing system 120 may include a system configuration module 131, an egress space module 132, an analytics module 133, a parking module 134, and a broadcasting module 135. A "module" may refer to a hardware based module, software based module or a module may be a combination of hardware and software. Embodiments of hardware based modules may include self-contained components such as chipsets, specialized circuitry and one or more memory devices, while a software-based module may be part of a program code or linked to the program code containing specific programmed instructions, which may be loaded in the memory device of the computer system 120. A module (whether hardware, software, or a combination thereof) may be designed to implement or execute one or more particular functions or routines.

Embodiments of the system configuration module 131 may include one or more components of hardware and/or software program code for identifying a user entering a vehicle. For instance, embodiments of the system configuration module 131 may identify or otherwise evaluate a user entering or exiting the vehicle. In an exemplary embodiment, a facial recognition sensor may be used to identify the person entering or exiting vehicle. Other biometric sensors may be used to confirm the identity of the user as the user enters the vehicle, such as a fingerprint sensor on a steering wheel of the vehicle, a voice recognition system, and the like. The system configuration module 131 may communicate with sensors 110 to identify the user as the user enters the vehicle, and may register the user with the computing system 120. Each occupant that enters the vehicle may be registered with the computing system 120, to save various information of the user and create a user profile associated with the user. The user profile may include information about the user, including historical data regarding a previously calculated minimum egress for the vehicle.

Moreover, embodiments of the system configuration module 131 may register the vehicle with the computing system 120. Registering the vehicle with the computing system 120 may include ensuring that the computing system 120 includes information and details regarding the vehicle, including a door size, a door frame size, a width of the vehicle, a size of the vehicle, and the like. Embodiments of the system configuration module 131 may also enable the sensors 110 at a startup of the computing system 120 or a startup of the vehicle (e.g. battery on, engine on, etc.)

Embodiments of the computing system 120 of the parking assistance system 100 may include am egress space module 132. Embodiments of the egress space module 132 may include one or more components of hardware and/or software program code for calculating a minimum egress space of the user, required for an egress of the user from the vehicle. For instance, the egress space module 132 may calculate or otherwise determine a minimum space surrounding a door of the vehicle that, when the door opened, allows the user to comfortable and conveniently exit the vehicle, without the door contacting an object or parked car nearby. The minimum egress space may be calculated for one or more occupants of the vehicle. In an exemplary embodiment, the egress space module 132 may calculate the minimum egress space for all occupants as the occupants enter the vehicle. Embodiments of the egress space module 132 may calculate the minimum egress space of a user(s) by processing a first data from at least one sensor 110 of the vehicle coupled to the computing system 120, the at least one sensor measuring a door angle of a door of the vehicle as the user opens the door to enter the vehicle, and processing a second data received from at least one camera coupled to the computing system 120, the at least one camera capturing a buffer space between the user and a door frame of the vehicle as the user enters the vehicle.

Figure 2:
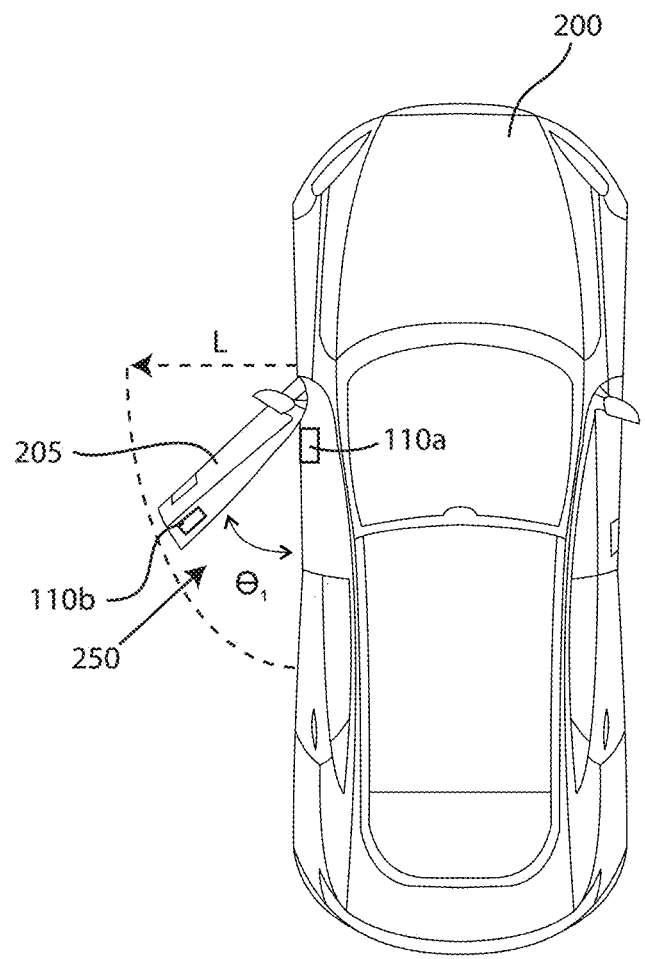
FIG. 2 depicts a first instance of calculating a minimum egress space of a user from a vehicle, in accordance with embodiments of the present invention.

FIG. 2 depicts a first instance of calculating a minimum egress space 250 of a user from a vehicle 200, in accordance with embodiments of the present invention. As a door 205 of the vehicle 200 is opened, or after the door 205 has been opened and become stationary, one or more sensors 110a, 110b may track and/or measure a door angle $\theta_1$. The door angle $\theta_1$ may be used in combination with a size of the door to calculate a total length L from a side of the vehicle 200. The total length L may be a distance extending perpendicularly from the side of the car that is equal to a maximum distance that the door 205 may extend from the vehicle 200, although the door 205 does not necessarily extend perpendicularly. In addition, the one or more sensors 110a, 110b may also detect, scan, capture, etc. the user entering the vehicle 200, which may determine a difference between the user and the door frame of the vehicle 200. For example, at least one camera coupled to the computing system 120 may capture a buffer space between the user and a door frame of the vehicle 200 as the user enters the vehicle 200. The one or more sensors 110a, 110b may also determine whether the user is carrying objects as the user enters the vehicle 200, which may impact the calculation of the minimum egress space 250. In some embodiments, the minimum egress space 250 may be defined as the area/volume shown within the dashed lines in FIG. 2. In other embodiments, the minimum egress space 250 may be defined only as the total length L, plus an optional buffer length that may add to the total length L for a safety buffer. The egress space module 132 of the computing system 120 may store the calculated minimum egress space 250 on the data repository 125 of the computing system 120, associated with the user that entered the vehicle 200 and identified by the system configuration module 131.

Figure 3:
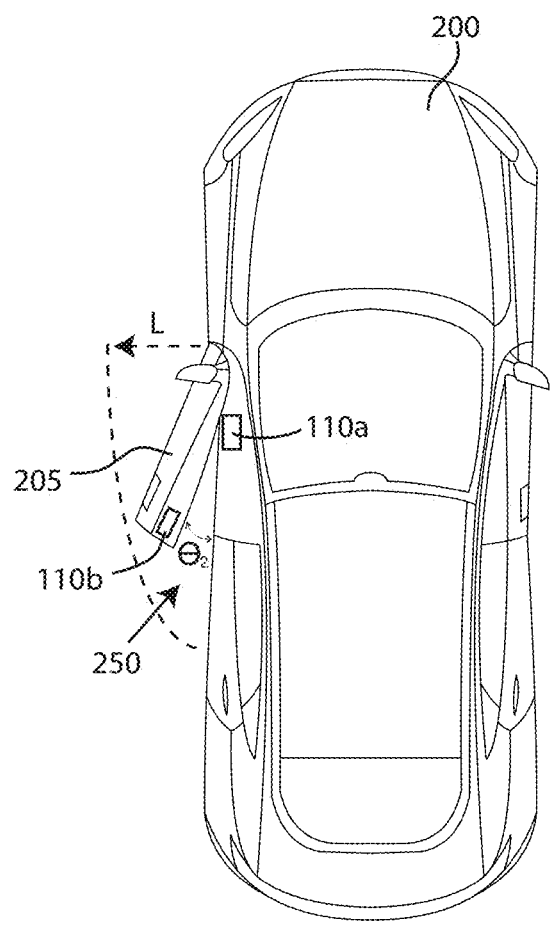
FIG. 3 depicts a second instance of calculating a minimum egress space of a user from a vehicle, in accordance with embodiments of the present invention.

FIG. 3 depicts a second instance of calculating a minimum egress space 250 of a user from a vehicle 200, in accordance with embodiments of the present invention. The user here may be the same user as associated with door angle $\theta_1$, or may be a different user. As a door 205 of the vehicle 200 is opened, or after the door 205 has been opened and become stationary, one or more sensors 110a, 110b may track and/or measure a door angle $\theta_2$. The door angle $\theta_2$ may be used in combination with a size of the door to calculate a total length L from a side of the vehicle 200. The total length L may be a distance extending perpendicularly from the side of the car that is equal to a maximum distance that the door 205 may extend from the vehicle 200, although the door 205 does not necessarily extend perpendicularly. In addition, the one or more sensors 110a, 110b may also detect, scan, capture, etc. the user entering the vehicle 200, which may determine a difference between the user and the door frame of the vehicle 200. For example, at least one camera coupled to the computing system 120 may capture a buffer space between the user and a door frame of the vehicle 200 as the user enters the vehicle 200. The one or more sensors 110a, 110b may also determine whether the user is carrying objects as the user enters the vehicle 200, which may impact the calculation of the minimum egress space 250. In some embodiments, the minimum egress space 250 may be defined as the area/volume shown within the dashed lines in FIG. 3. In other embodiments, the minimum egress space 250 may be defined only as the total length L, plus an optional buffer length that may add to the total length L for a safety buffer. The egress space module 132 of the computing system 120 may store the calculated minimum egress space 250 on the data repository 125 of the computing system 120, associated with the user that entered the vehicle 200 and identified by the system configuration module 131. The total length L associated with FIG. 2 is larger than the total length L associated with FIG. 3, which may be a result of the user now not carrying objects, the user has lost weight, the user is a different user who is smaller in size has entered the vehicle 200, and the like.

Figure 4:
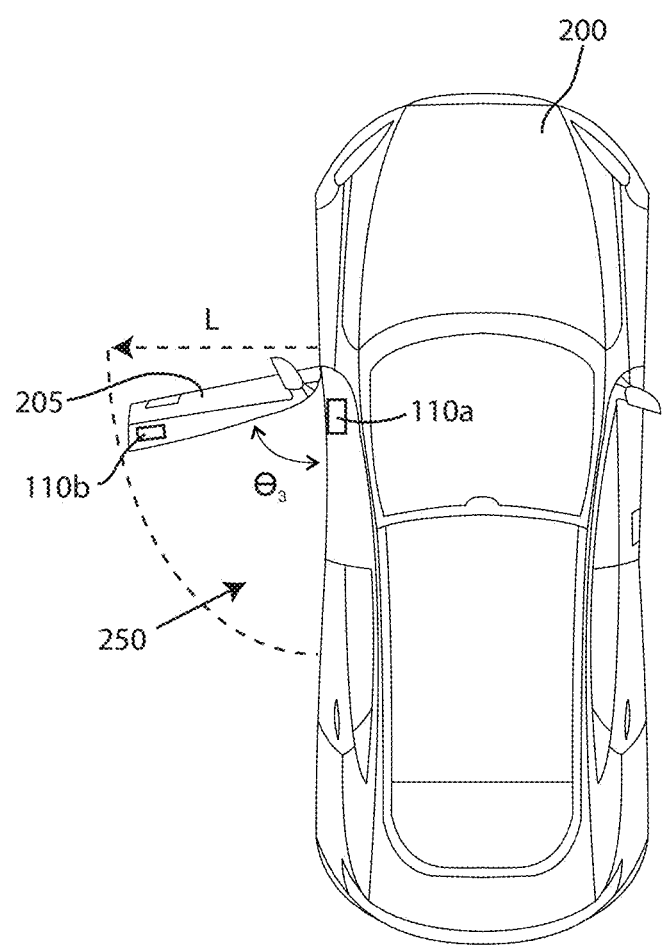
FIG. 4 depicts a third instance of calculating a minimum egress space of a user from a vehicle, in accordance with embodiments of the present invention.

FIG. 4 depicts a third instance of calculating a minimum egress space 250 of a user from a vehicle 200, in accordance with embodiments of the present invention. The user here may be the same user as associated with door angle $\theta_1$, $\theta_2$, or may be a different user. As a door 205 of the vehicle 200 is opened, or after the door 205 has been opened and become stationary, one or more sensors 110a, 110b may track and/or measure a door angle $\theta_3$. The door angle $\theta_3$ may be used in combination with a size of the door to calculate a total length L from a side of the vehicle 200. The total length L may be a distance extending perpendicularly from the side of the car that is equal to a maximum distance that the door 205 may extend from the vehicle 200, although the door 205 does not necessarily extend perpendicularly. In addition, the one or more sensors 110a, 110b may also detect, scan, capture, etc. the user entering the vehicle 200, which may determine a difference between the user and the door frame of the vehicle 200. For example, at least one camera coupled to the computing system 120 may capture a buffer space between the user and a door frame of the vehicle 200 as the user enters the vehicle 200. The one or more sensors 110a, 110b may also determine whether the user is carrying objects as the user enters the vehicle 200, which may impact the calculation of the minimum egress space 250. In some embodiments, the minimum egress space 250 may be defined as the area/volume shown within the dashed lines in FIG. 4. In other embodiments, the minimum egress space 250 may be defined only as the total length L, plus an optional buffer length that may add to the total length L for a safety buffer. The egress space module 132 of the computing system 120 may store the calculated minimum egress space 250 on the data repository 125 of the computing system 120, associated with the user that entered the vehicle 200 and identified by the system configuration module 131. The total length L associated with FIG. 2 is larger than the total length L associated with FIG. 3, but the total length L is the largest in FIG. 4, which may be a result of the user now carrying additional objects, or that the a different user who is smaller in size has entered the vehicle 200.

FIGS. 2-4 depict various instances of calculating a minimum egress space 250 for one or more different users on a driver's side door. However, each door of the vehicle 200 may include one or more sensors 110 for calculating a minimum egress space 250 for users entering the vehicle 200 from any door. The calculating by the egress space module 132 may be done simultaneously or in real-time as the users/occupants enter the vehicle 200. Furthermore, FIGS. 2-4 depict various egress spaces 250 that may not only be customized for different users entering the vehicle 200, but also the same user having a varying condition. For example, the user may be carrying one or more objects, which means that the minimum egress space 250 typically associated with the user (e.g. egress space 250 shown in FIG. 2) may be larger (e.g. egress space 250 shown in FIG. 3) to accommodate the additional objects. In another embodiment, the user may be pregnant, and during the pregnancy, the user's minimum egress space 250 may gradually change. Embodiments of the egress space module 132 may calculate the minimum egress space 250 each time a user(s) enters and exits the vehicle 200 to constantly update the most current minimum egress space 250 calculation, as well as learn over time a precise average egress space 250 associated with the user(s). Accordingly, to determine a minimum egress space 250 of a user, embodiments of the egress space module 132 may access a user profile stored on the computing system 120, in response to the identifying the user, the user profile including a historical average minimum egress space for the user, based on previous exits and entries of the user from the vehicle 200.

Referring back to FIG. 1, embodiments of the computing system 120 of the parking assistance system 100 may include an analytics module 133. Embodiments of the analytics module 133 may include one or more components of hardware and/or software program code for detecting a parking space proximate at least one object and determining a viability of the parking space based on the minimum egress space. For instance, the analytics module 133 may utilize one or more sensors 110 to detect, measure, scan, evaluate, analyze, etc. a space proximate at least one object or between two objects. The parking space detection may be in response to a user activating a detection mode by pressing a button inside the vehicle 200, or may be constantly automatically detecting, scanning, etc. area in front of the vehicle 200. In response to the detection of the parking space, the analytics module 133 may determine a viability of the parking space. The viability determination may also be constantly processing in response to the constant detection ahead of the vehicle 200, or may actuated or otherwise triggered by an actuation by a user pressing a button, or may be actuated by a sensing of the steering direction turning toward the parking space, a reduction of speed below a certain threshold, or the like.

Figure 5:
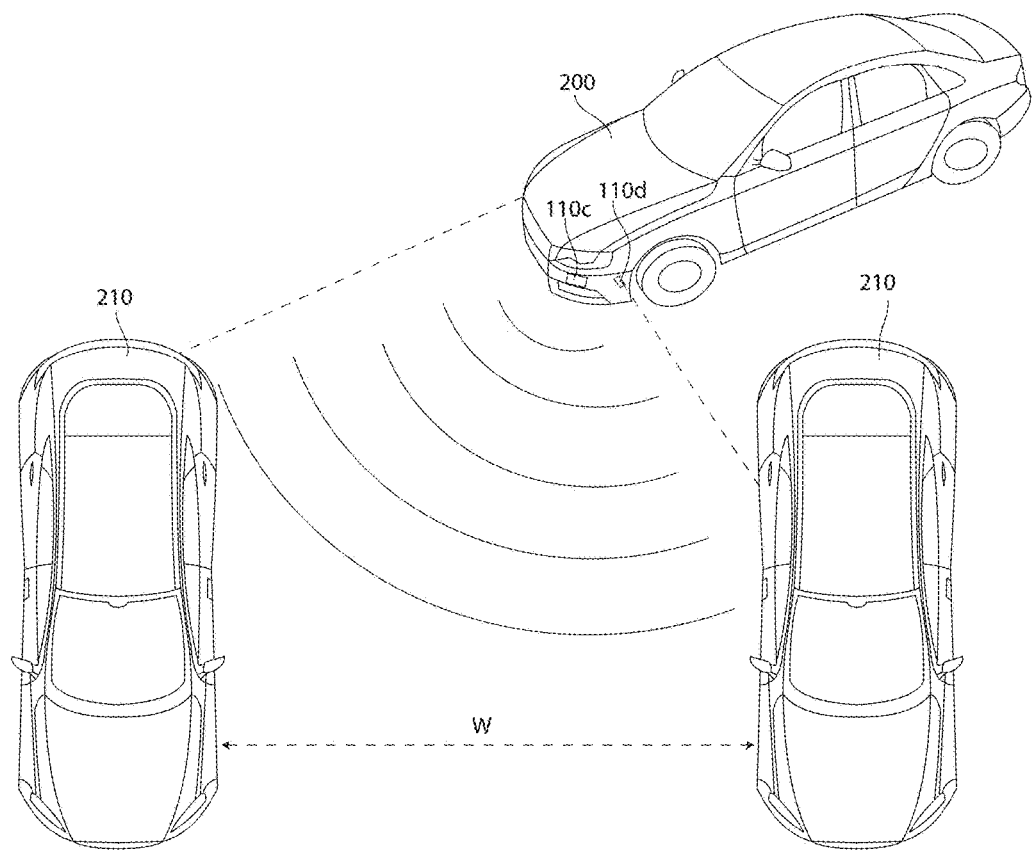
FIG. 5 depicts a vehicle detecting a parking space and determining a viability of the parking space, in accordance with embodiments of the present invention.

FIG. 5 depicts a vehicle detecting a parking space and determining a viability of the parking space, in accordance with embodiments of the present invention. The analytics module 133 may obtain a width W of the parking space, the width W of the parking space measured by one or more vehicle sensors 110c, 110d positioned proximate a front end of the vehicle 200. In an exemplary embodiment, the one or more sensors 110c, 110d may be a proximity sensor, an ultrasonic sensor, a radar system, a camera, a laser, and/or a combination thereof. The width W of the parking space may be a distance between two objects, such as a parked vehicle 210. The objects may also be a barricade, a pole, a light, a wall, or other object that may hinder or preclude a user from egressing from the vehicle 200 within the minimum egress space 250. In embodiments where the at least one object is a parked car 210, the analytics module 133 may also accommodate for an egress space for a user of the parked car 210. In one embodiment, the analytics module 133 may attribute an average egress space for a motor vehicle. In other embodiments, the analytics module 133 may receive a broadcasted signal from the at least one parked car 210, the broadcasted signal including data relating to a customized egress requirement of a parked vehicle 210 adjacent to the parking space. For instance, a parked car 210 including a parking assistance system 100 may broadcast or otherwise transmit customized egress space calculations for the occupants of the parked car 210, which may be received by the analytics module 133 for viability determination calculations.

Thus, embodiments of the analytics module 133 may analyze or otherwise process the width W of the parking space, a width of the vehicle 200, one or more calculated minimum egress spaces 250 of one or more users, and the data relating to an egress requirement of the parked vehicle 210, to determine the viability of the parking space. As an example, the analytics module 133 may conclude that the parking space is viable if the width of the parking space W minus the egress spaces required for the one or more parked vehicles 210 is greater than the width of the vehicle 200 plus the calculated egress spaces 250 of the occupants of the vehicle 200. The viability of the parking space may be determined as the vehicle approaches the parking space, and may provide updates, notifications, alerts, and the like to the user/occupants inside the vehicle 200. If the parking space is determined to be not viable, the computing system 120 may provide a notification to the user via a display inside the vehicle 200, recommending that the users/occupants exit the vehicle 200, prior to the user attempting to park the vehicle 200.

With continued reference to FIG. 1, embodiments of the computing system 120 of the parking assistance system 100 may include a parking module 134. Embodiments of the parking module 134 may include one or more components of hardware and/or software program code for assisting the parking operation or fully automating the parking operation. For instance, in response to the determining that the parking space is viable, the parking module 134 may assist the user/driver in optimally positioning the vehicle 200 within the parking space by providing steering instructions to the user/driver as the vehicle advances toward the parking space. The steering instructions may be a left/right command to steer the vehicle 200 to the left or to the right.

Figure 6:
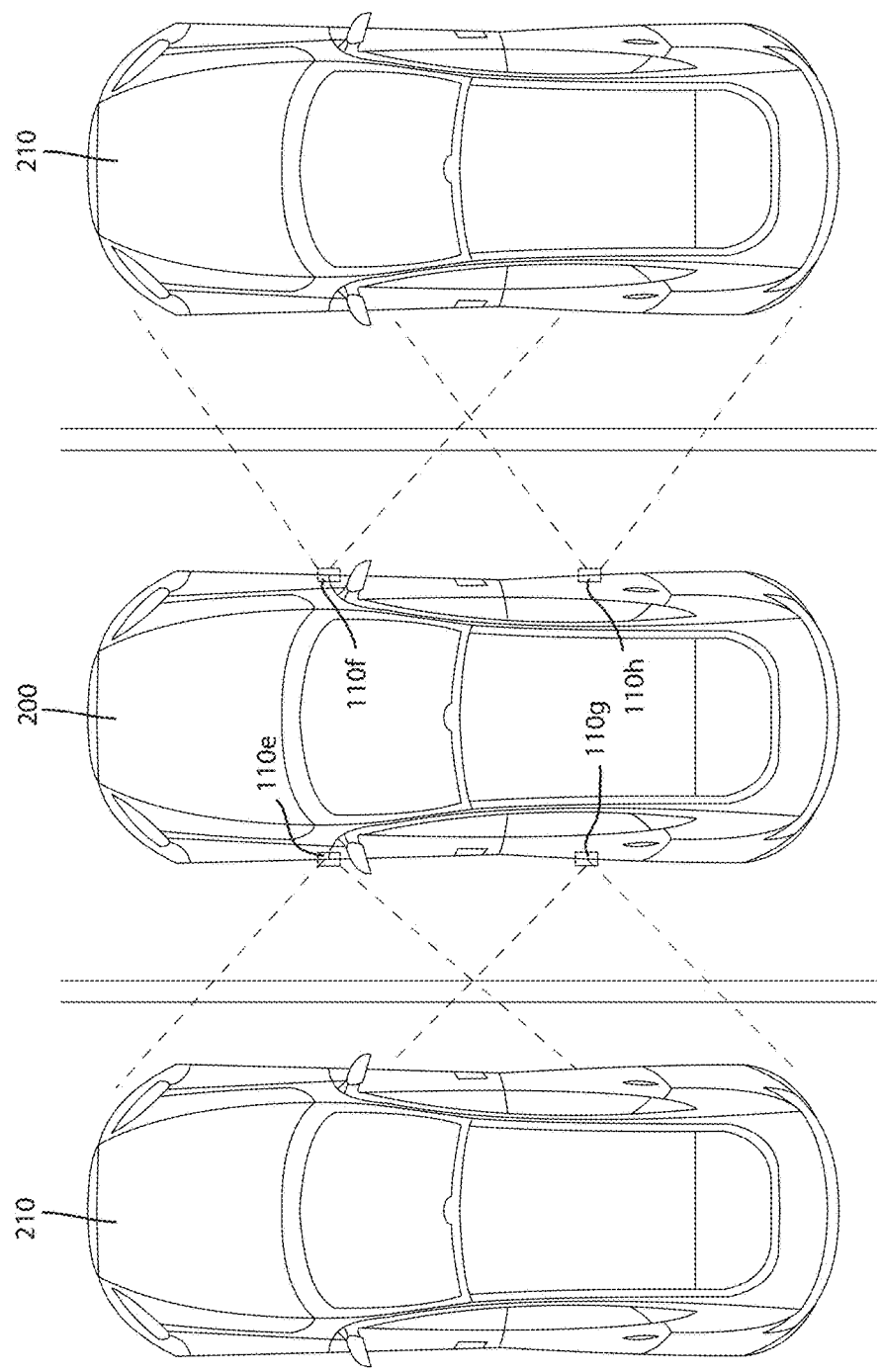
FIG. 6 depicts a verification process that the customized minimum egress space for the user is accommodated in a parked position between two objects, in accordance with embodiments of the present invention.

FIG. 6 depicts a verification process that the customized minimum egress space for the user is accommodated in a parked position between two objects, in accordance with embodiments of the present invention. Once the vehicle 200 is parked in the parking space, embodiments of the parking module 134 may verify that a distance between the vehicle 200 and the at least one object 210 is greater than the customized minimum egress space required by the user. In an exemplary embodiment, one or more sensors 110e, 110f, 110g, 110g may be positioned on both sides of the vehicle 200 to perform a verification that the egress spaces associated with the occupants of the vehicle 200 are indeed accommodated, in the final parked position. The parking module 134 may alert the user that the user can exit the vehicle if the verification process confirms that the egress spaces for all occupants are accommodated. Conversely, the parking module 134 may alert the user that the user should not exit the vehicle 200, and reattempt the parking operation.

Figure 7:
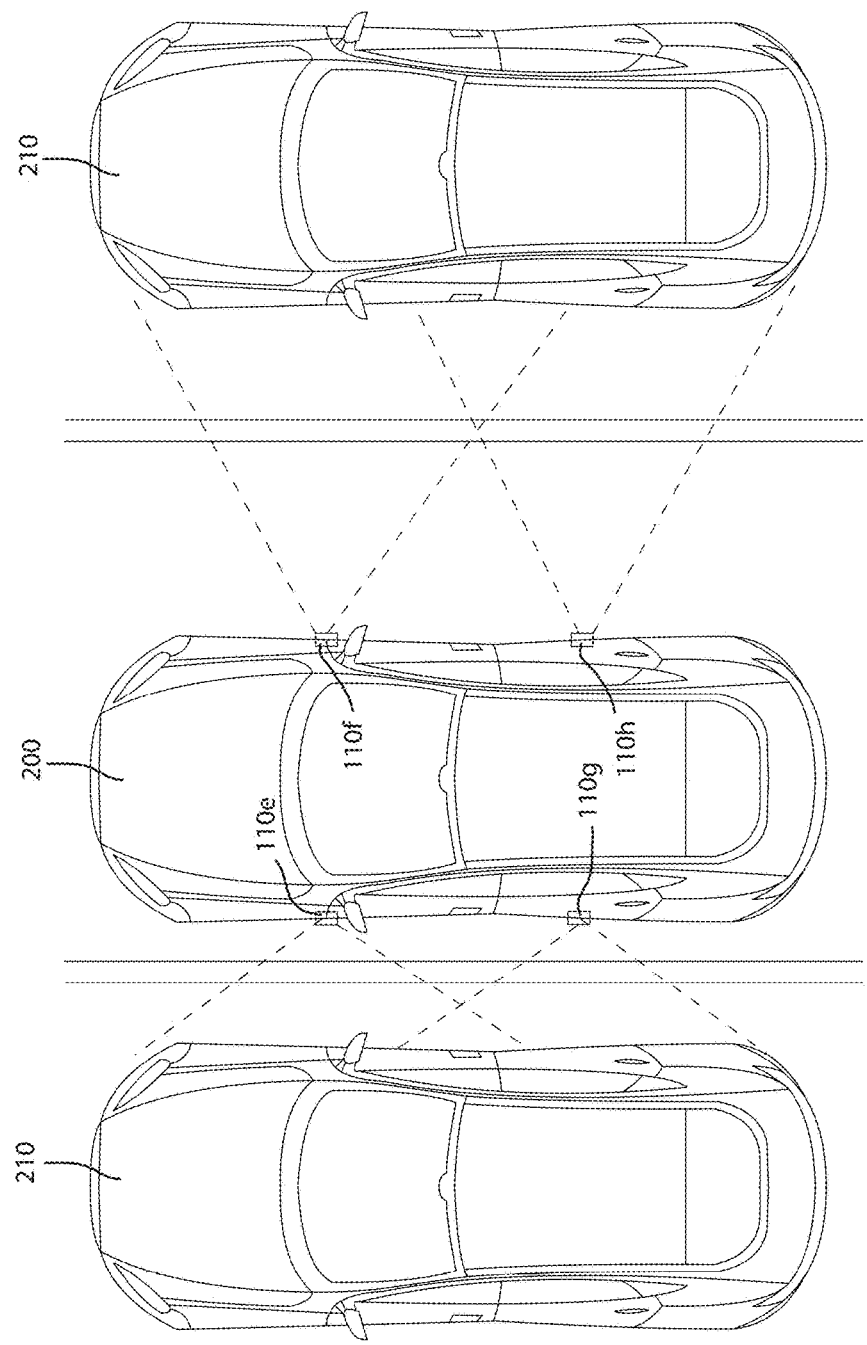
FIG. 7 depicts a vehicle parked in an off-center optimal position within the parking space, in accordance with embodiments of the present invention.

In some embodiments, the optimal position within the parking space may not be a center position within the parking space. FIG. 7 depicts a vehicle parked in an off-center optimal position within the parking space, in accordance with embodiments of the present invention. Embodiments of the parking module 134 may provide guide the user to position the car off-center based on the calculated minimum egress spaces 250 of the occupants in the vehicle 200 and/or based on the received egress requirements of the parked vehicles 210. For example, as shown in FIG. 7, the parking module 134 has automatically parked or guided the user to park the vehicle 200 in a left-of-center position (i.e. closer to the parked vehicle 210 to the left of the vehicle 200). Parking the vehicle 200 in the left-of-center position may have been a result of the calculated, customized minimum egress spaces of occupants on the passenger side of the vehicle 200 being larger than the egress spaces of the occupants on the driver side of the vehicle, and thus more distance is needed between the vehicle 200 and the parked vehicle 210 to the right of the vehicle 200. Alternatively, parking the vehicle 200 in the left-of-center position may have been a result of the received egress requirements of the parked vehicles 210, wherein the driver side of the parked vehicle 210 to the right of the vehicle 200 was more than a normal or typical egress space. Thus, the parking module 134 accommodated for the egress requirements of the parked vehicles 210, and positioned the vehicle 200 in an optimal position. Further, embodiments of the parking module 134 may determine an optimal parking position within the parking space by considering both the egress spaces 250 of the occupants in the vehicle 200 and the received egress signals from the parked cars 210.

Figure 8:
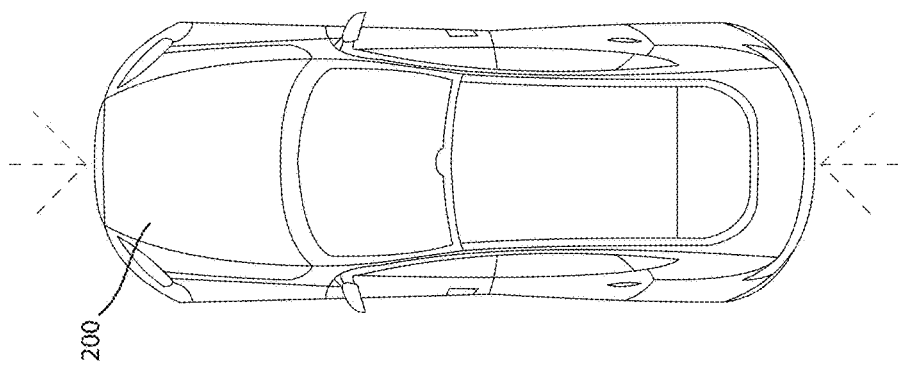
FIG. 8 depicts a plurality of vehicles broadcasting customized egress requirements to other vehicles, in accordance with embodiments of the present invention.
Figure 8:
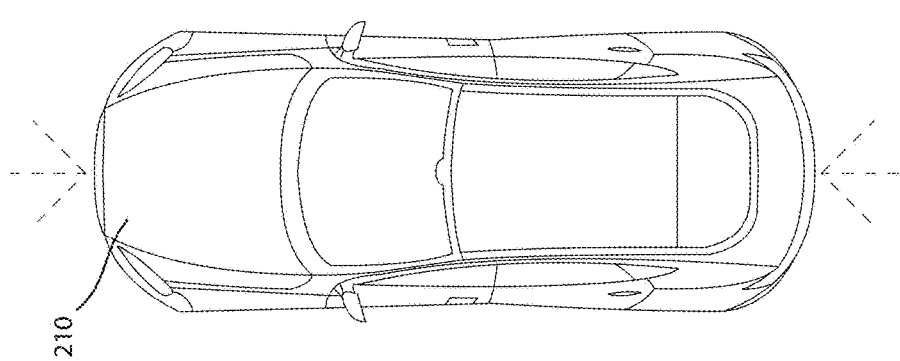

Embodiments of the computing system 120 of the parking assistance system 100 may further include a broadcast module 135. Embodiments of the broadcast module 135 may include one or more components of hardware and/or software program code for broadcasting or otherwise transmitting the minimum egress space(s) 250 to be received by other vehicles. FIG. 8 depicts a plurality of vehicles broadcasting customized egress requirements to other vehicles, in accordance with embodiments of the present invention. Embodiments of the broadcast module 135 may broadcast or otherwise transmit the minimum egress space requirements for the current occupants of the vehicle 200; the current occupants of the vehicle may refer to occupants not currently sitting in the vehicle, but the users who have most recently exited the vehicle after the vehicle has parked (e.g. the most likely occupants to return to the vehicle and enter the vehicle). The egress requirements may be broadcast as a signal over a network, a vehicle-to-vehicle network, a short distance communication network, or the like. By broadcasting the customized egress space requirements, other vehicles may utilize the custom egress requirements to determine if the parking space adjacent the vehicle 200 is a viable parking space, similar to the methods described above in association with the parking module 134.

Embodiments of the computing system 120 of the parking assistance system 100 may be equipped with a memory device 142 which may store the vehicle data, sensor data, and/or user data, and a processor 141 for implementing the tasks associated with the parking assistance system 100. Furthermore, various tasks and specific functions of the modules of the computing system 120 may be performed by additional modules, or may be combined into other module(s) to reduce the number of modules.

Figure 9:
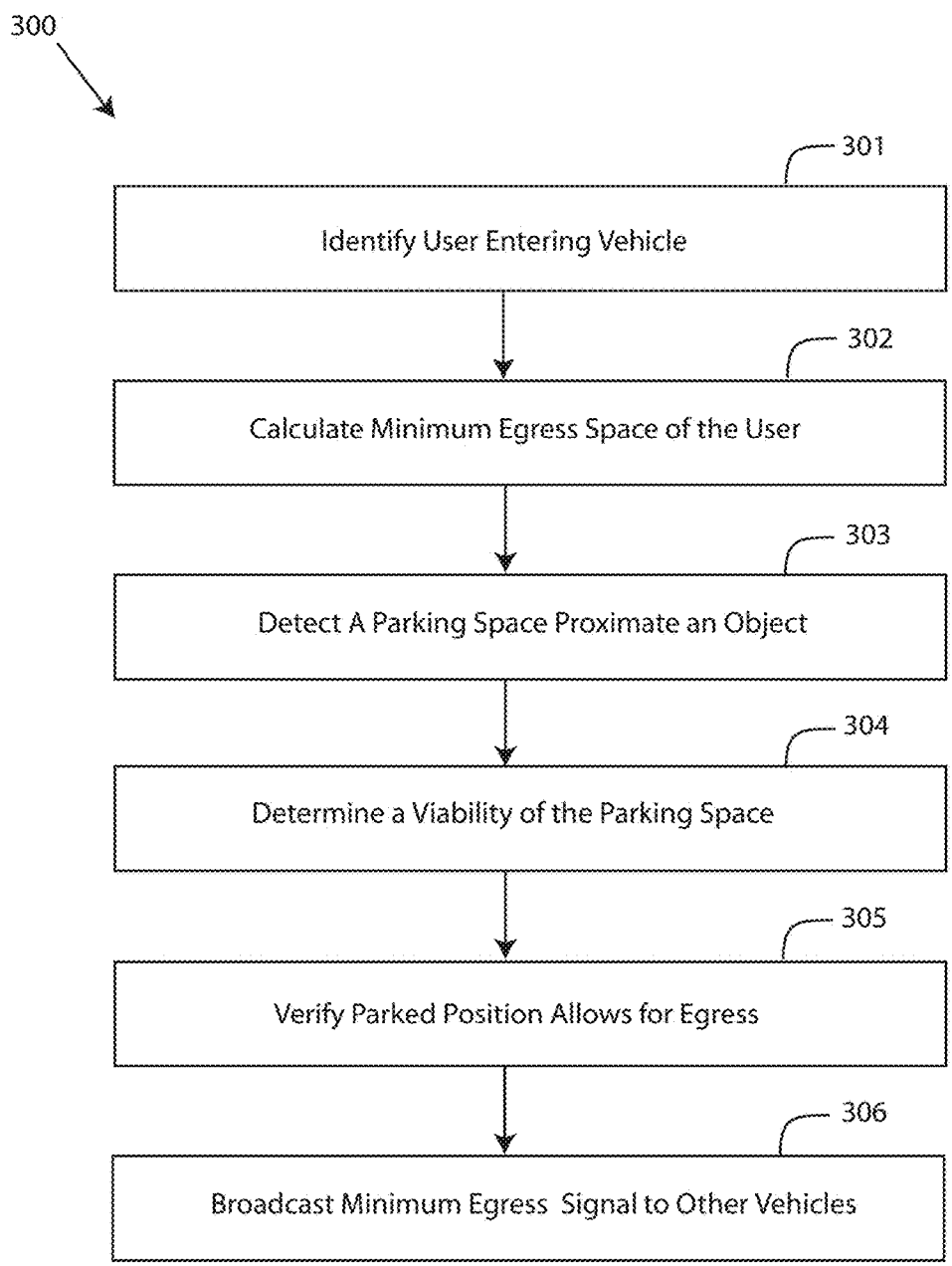
FIG. 9 depicts a flow chart of a method for assisting a parking of a vehicle based on a customized egress requirements, in accordance with embodiments of the present invention.

Referring now to FIG. 9, which depicts a flow chart of a method 300 for assisting a parking of a vehicle based on a customized egress requirements, in accordance with embodiments of the present invention. One embodiment of a method 300 or algorithm that may be implemented for assisting a parking of a vehicle based on a customized egress requirements in accordance with the parking assistance system 100 described in FIG. 1 using one or more computer systems as defined generically in FIG. 11 below, and more specifically by the specific embodiments of FIG. 1.

Embodiments of the method 300 for assisting a parking of a vehicle based on a customized egress requirements may begin at step 301 wherein a user is identified when entering a vehicle 200. The user may be identified by one or more sensors 110, which include one or more biometric sensors. The identity of the user(s) may be confirmed by additional biometric sensors inside the vehicle 200. Step 302 calculates a minimum egress space for each user entering the vehicle 200. The minimum egress space may be a distance or space next to the vehicle 200 that allows the user to egress from the vehicle 200.

Figure 10:
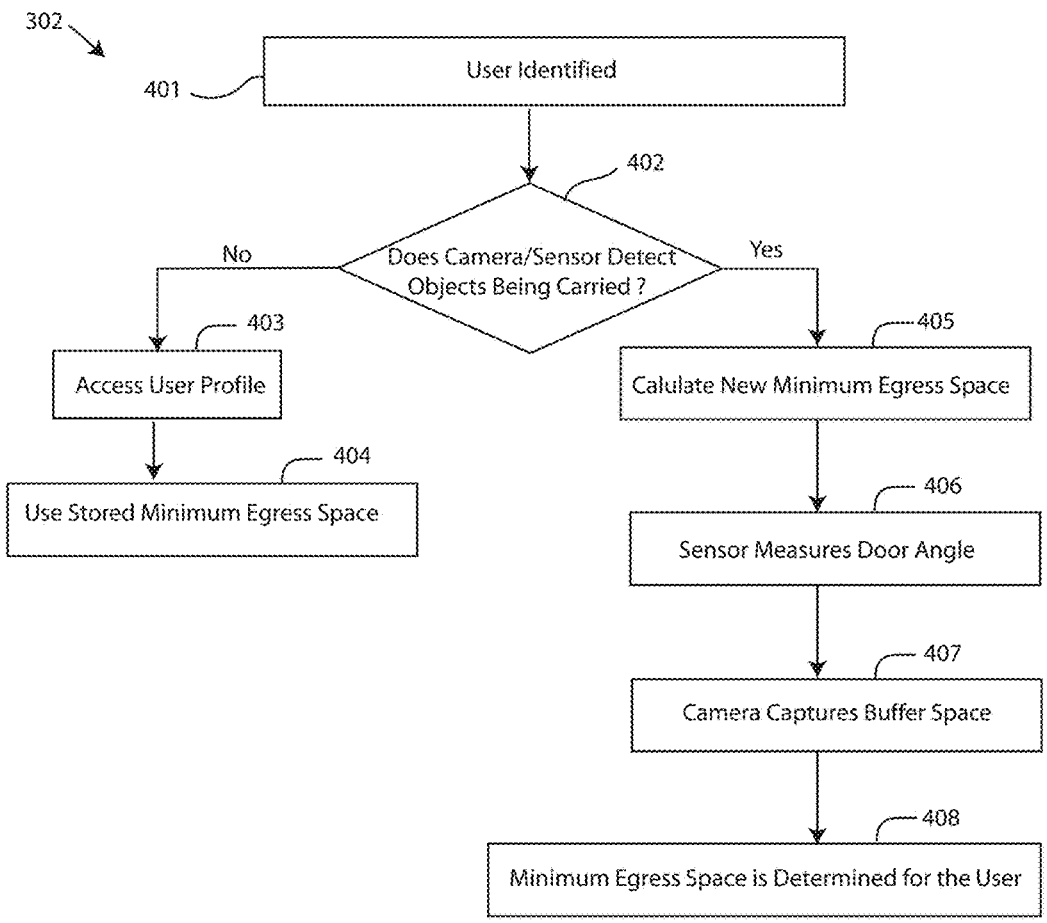
FIG. 10 depicts a flow chart of a step of the method of FIG. 9 for assisting a parking of a vehicle based on a customized egress requirements, in accordance with embodiments of the present invention.

FIG. 10 depicts a flow chart of step 302 of the method of FIG. 9 for assisting a parking of a vehicle based on a customized egress requirements, in accordance with embodiments of the present invention. At step 302, the minimum egress space of a user is calculated as described above. In some embodiments, the minimum egress space may be determined by using a stored value or a value learned over time. However, if the registered user is carrying objects, then the minimum egress space required may change. Thus, in response to the user being identified step 402, step 402 determines whether a camera/sensor detects objects being carried. If the camera/sensor does not detect objects being carried by the user, then step 403 accesses the user profile and step 404 uses the stored minimum egress space. If the camera/sensor does detect one or more objects being carried or towed by the user, then step 405 calculates a new or current minimum egress space of the user. To calculate the new or current minimum egress space of the user, a sensor measures a door angle of the door being opened by the user carrying objects, at step 406. Step 407 captures a buffer space with a camera and/or one or more other sensors 110, and the new or current minimum egress space is determined for the user at step 408.

Referring back to FIG. 9, embodiments of method 200 may include a step 303, which detects a parking space proximate at least one object. Step 304 determines a viability of the detected parking space, such that the size/area of the parking space will accommodate the minimum egress spaces calculated for each occupant of the vehicle. Step 305 verifies that the parked position allows for egress of the occupants, according to the customized egress requirements of the occupants. Step 306 broadcasts the customized egress requirements when the vehicle 200 is parked, to be received by other vehicle to assist in the other vehicle's calculation of a viability of a parking space adjacent to the vehicle 200.

Figure 11:
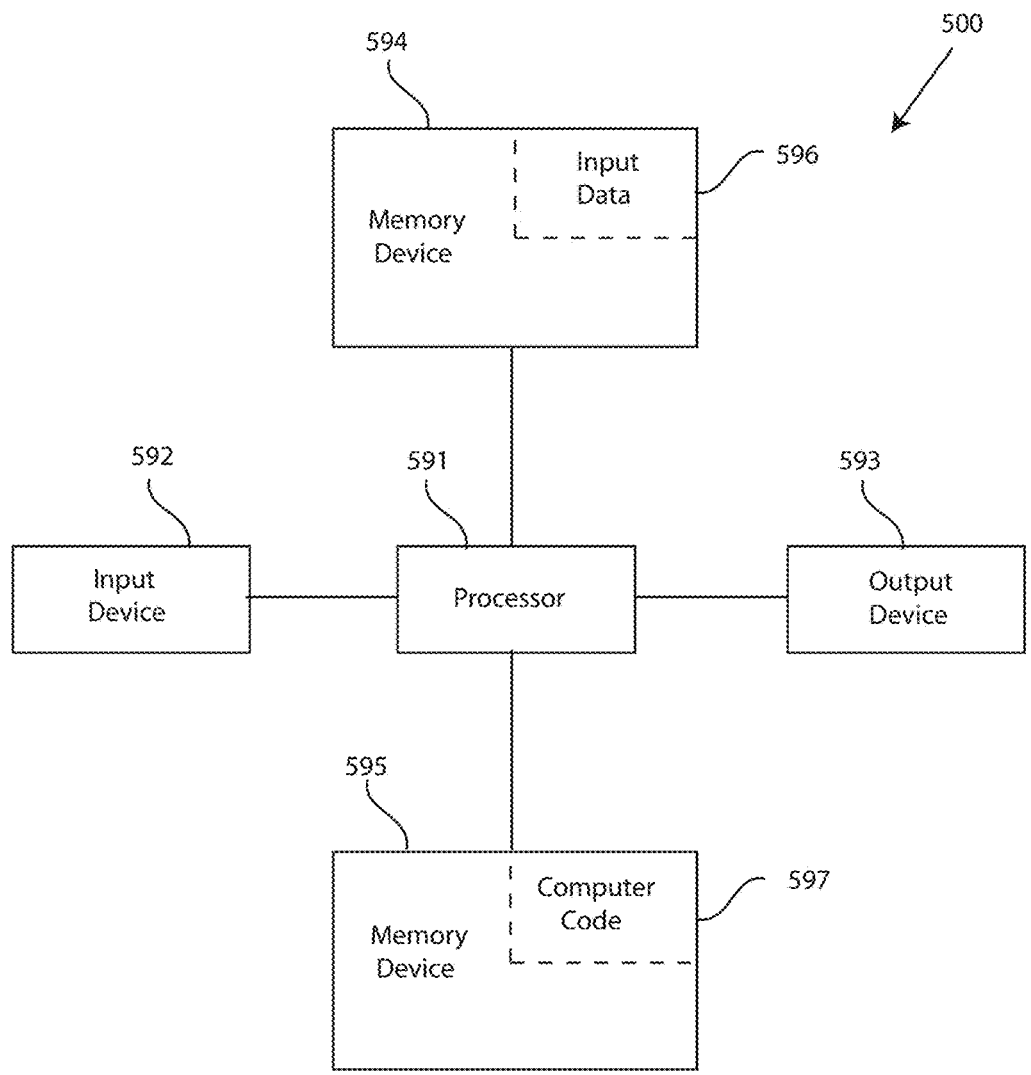
FIG. 11 depicts a block diagram of a computer system for the parking system of FIG. 1, capable of implementing methods for assisting a parking of a vehicle based on a customized egress requirements of FIG. 9, in accordance with embodiments of the present invention.

FIG. 11 depicts a block diagram of a computer system for the parking system of FIG. 1, capable of implementing methods for assisting a parking of a vehicle based on a customized egress requirements of FIG. 9, in accordance with embodiments of the present invention. The computer system 500 may generally comprise a processor 591, an input device 592 coupled to the processor 591, an output device 593 coupled to the processor 591, and memory devices 594 and 595 each coupled to the processor 591. The input device 592, output device 593 and memory devices 594, 595 may each be coupled to the processor 591 via a bus. Processor 591 may perform computations and control the functions of computer 500, including executing instructions included in the computer code 597 for the tools and programs capable of implementing a method for assisting a parking of a vehicle based on a customized egress requirements, in the manner prescribed by the embodiments of FIGS. 9-10 using the parking assistance system of FIG. 1, wherein the instructions of the computer code 597 may be executed by processor 591 via memory device 595. The computer code 597 may include software or program instructions that may implement one or more algorithms for implementing the methods of assisting a parking of a vehicle based on a customized egress requirements, as described in detail above. The processor 591 executes the computer code 597. Processor 591 may include a single processing unit, or may be distributed across one or more processing units in one or more locations (e.g., on a client and server).

The memory device 594 may include input data 596. The input data 596 includes any inputs required by the computer code 597. The output device 593 displays output from the computer code 597. Either or both memory devices 594 and 595 may be used as a computer usable storage medium (or program storage device) having a computer readable program embodied therein and/or having other data stored therein, wherein the computer readable program comprises the computer code 597. Generally, a computer program product (or, alternatively, an article of manufacture) of the computer system 500 may comprise said computer usable storage medium (or said program storage device).

Memory devices 594, 595 include any known computer readable storage medium, including those described in detail below. In one embodiment, cache memory elements of memory devices 594, 595 may provide temporary storage of at least some program code (e.g., computer code 597) in order to reduce the number of times code must be retrieved from bulk storage while instructions of the computer code 597 are executed. Moreover, similar to processor 591, memory devices 594, 595 may reside at a single physical location, including one or more types of data storage, or be distributed across a plurality of physical systems in various forms. Further, memory devices 594, 595 can include data distributed across, for example, a local area network (LAN) or a wide area network (WAN). Further, memory devices 594, 595 may include an operating system (not shown) and may include other systems not shown in FIG. 11.

In some embodiments, the computer system 500 may further be coupled to an Input/output (I/O) interface and a computer data storage unit. An I/O interface may include any system for exchanging information to or from an input device 592 or output device 593. The input device 592 may be, inter alia, a keyboard, a mouse, etc. or in some embodiments the sensors 110. The output device 593 may be, inter alia, a printer, a plotter, a display device (such as a computer screen), a magnetic tape, a removable hard disk, a floppy disk, etc. The memory devices 594 and 595 may be, inter alia, a hard disk, a floppy disk, a magnetic tape, an optical storage such as a compact disc (CD) or a digital video disc (DVD), a dynamic random access memory (DRAM), a read-only memory (ROM), etc. The bus may provide a communication link between each of the components in computer 500, and may include any type of transmission link, including electrical, optical, wireless, etc.

An I/O interface may allow computer system 500 to store information (e.g., data or program instructions such as program code 597) on and retrieve the information from computer data storage unit (not shown). Computer data storage unit includes a known computer-readable storage medium, which is described below. In one embodiment, computer data storage unit may be a non-volatile data storage device, such as a magnetic disk drive (i.e., hard disk drive) or an optical disc drive (e.g., a CD-ROM drive which receives a CD-ROM disk). In other embodiments, the data storage unit may include a knowledge base or data repository 125 as shown in FIG. 1.

As will be appreciated by one skilled in the art, in a first embodiment, the present invention may be a method; in a second embodiment, the present invention may be a system; and in a third embodiment, the present invention may be a computer program product. Any of the components of the embodiments of the present invention can be deployed, managed, serviced, etc. by a service provider that offers to deploy or integrate computing infrastructure with respect to parking assistance systems and methods. Thus, an embodiment of the present invention discloses a process for supporting computer infrastructure, where the process includes providing at least one support service for at least one of integrating, hosting, maintaining and deploying computer-readable code (e.g., program code 597) in a computer system (e.g., computer 500) including one or more processor(s) 591, wherein the processor(s) carry out instructions contained in the computer code 597 causing the computer system to assist a parking of a vehicle based on a customized egress requirements. Another embodiment discloses a process for supporting computer infrastructure, where the process includes integrating computer-readable program code into a computer system including a processor.

The step of integrating includes storing the program code in a computer-readable storage device of the computer system through use of the processor. The program code, upon being executed by the processor, implements a method of assisting a parking of a vehicle based on a customized egress requirements. Thus, the present invention discloses a process for supporting, deploying and/or integrating computer infrastructure, integrating, hosting, maintaining, and deploying computer-readable code into the computer system 500, wherein the code in combination with the computer system 500 is capable of performing a method for assisting a parking of a vehicle based on a customized egress requirements.

A computer program product of the present invention comprises one or more computer readable hardware storage devices having computer readable program code stored therein, said program code containing instructions executable by one or more processors of a computer system to implement the methods of the present invention.

A computer system of the present invention comprises one or more processors, one or more memories, and one or more computer readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 12:
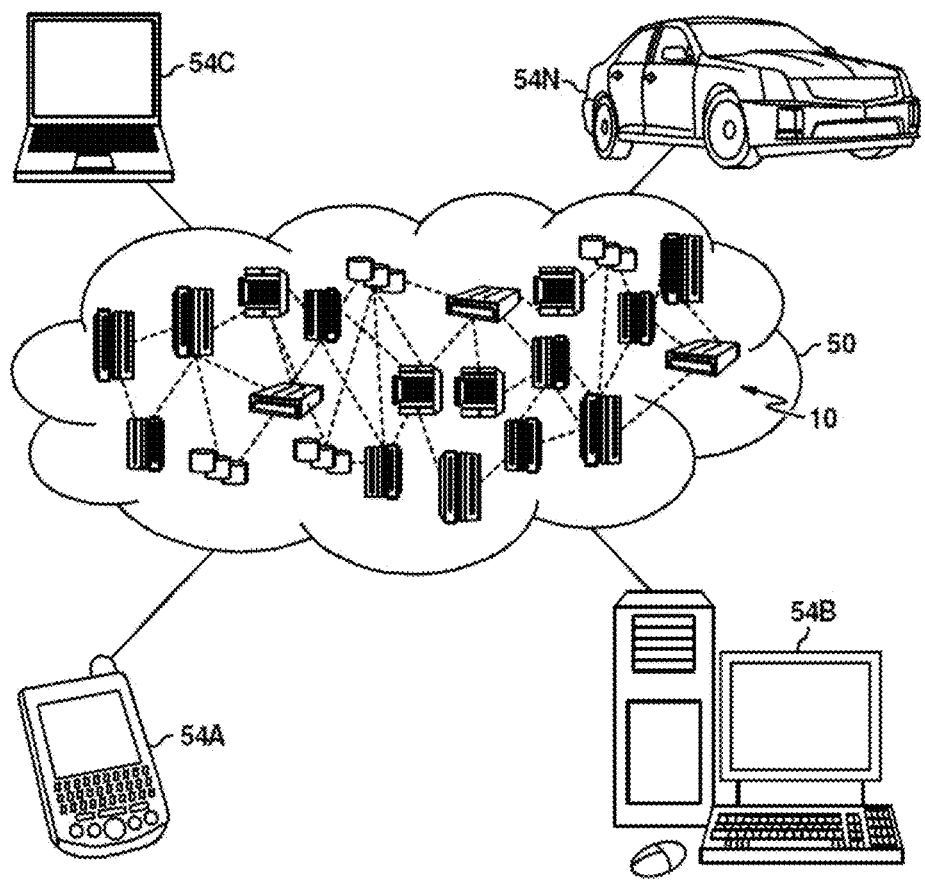
FIG. 12 depicts a cloud computing environment, in accordance with embodiments of the present invention.

Referring now to FIG. 12, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 12 are intended to be illustrative only and that computing nodes 10 and cloud computing environment 50 can communicate with any type of computerized device over any type of network and/or network addressable connection (e.g., using a web browser).

Figure 13:
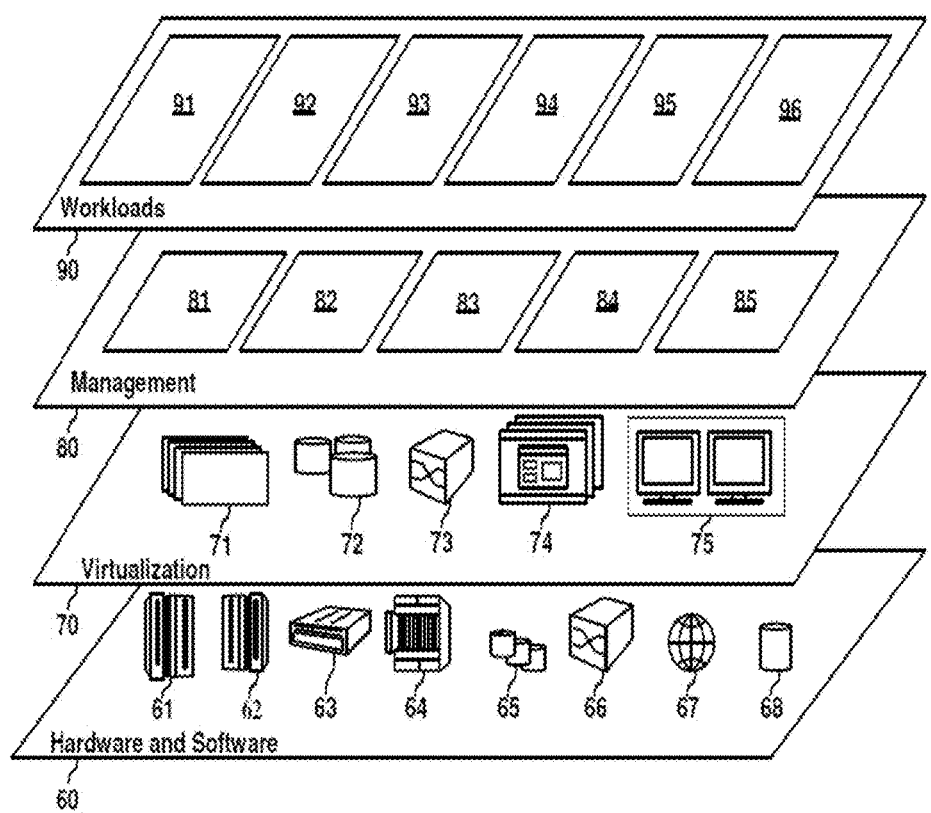
FIG. 13 depicts abstraction model layers, in accordance with embodiments of the present invention.

Referring now to FIG. 13, a set of functional abstraction layers provided by cloud computing environment 50 (see FIG. 12) is shown. It should be understood in advance that the components, layers, and functions shown in FIG. 13 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and parking assistance based on a customized egress requirements 96.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for assisting a parking of a vehicle based on a customized egress requirements, the method comprising:
    identifying, by a processor of a computing system, a user entering the vehicle;
    calculating, by the processor, a minimum egress space of the user, required for an egress of the user from the vehicle, wherein the calculating the minimum egress space comprises: processing, by the processor, a first data from at least one sensor of the vehicle coupled to the computing system, the at least one sensor measuring a door angle of a door of the vehicle as the user opens the door to enter the vehicle, and a second data received from at least one camera coupled to the computing system, the at least one camera capturing a buffer space between the user and a door frame of the vehicle as the user enters the vehicle;
    detecting, by the processor, a parking space proximate at least one object;
    determining, by the processor, a viability of the parking space based on the minimum egress space;
    verifying, by the processor, that a distance between the vehicle and the at least one object is greater than the minimum egress space, when the vehicle is parked in the parking space; and
    broadcasting, by the processor, the minimum egress space to be received by other vehicles.

2. The method of claim 1, wherein the calculating the minimum egress space comprises:
    accessing, by the processor, a user profile stored on the computing system, in response to the identifying the user, the user profile including a historical average minimum egress space for the user, based on previous exits and entries of the user from the vehicle.

3. The method of claim 1, wherein the determining the viability of the parking space comprises:
    obtaining, by the processor, a width of the parking space, the width of the parking space measured by at least one vehicle sensor positioned proximate a front end of the vehicle;
    receiving, by the processor, a broadcasted signal from the at least one object, the broadcasted signal including data relating to an egress requirement of a parked vehicle adjacent to the parking space; and
    analyzing, by the processor, the width of the parking space, a width of the vehicle, the minimum egress space of the user, and the data relating to an egress requirement of the parked vehicle, to determine the viability of the parking space;

wherein the viability of the parking space is determined as the vehicle approaches the parking space.

4. The method of claim 1, wherein, when the parking space is not viable, recommending, by the processor, that the user exit the vehicle, prior to the user attempting to park the vehicle.

5. The method of claim 1, further comprising: providing, by the processor, steering instructions to the user during a parking sequence so that the vehicle is optimally positioned within the parking space.

6. The method of claim 1, wherein the vehicle includes a self-driving feature, such that the vehicle automatically parks the vehicle, in response to the detecting the parking space and determining that the parking space is viable.

7. A computer system, comprising:
a processor;
a memory device coupled to the processor;
one or more sensors coupled to the processor; and
a computer readable storage device coupled to the processor, wherein the storage device contains program code executable by the processor via the memory device to implement a method for assisting a parking of a vehicle based on a customized egress requirements, the method comprising:
identifying, by a processor of a computing system, a user entering the vehicle;
calculating, by the processor, a minimum egress space of the user, required for an egress of the user from the vehicle, wherein the calculating the minimum egress space comprises: processing, by the processor, a first data from at least one sensor of the vehicle coupled to the computing system, the at least one sensor measuring a door angle of a door of the vehicle as the user opens the door to enter the vehicle, and a second data received from at least one camera coupled to the computing system, the at least one camera capturing a buffer space between the user and a door frame of the vehicle as the user enters the vehicle;
detecting, by the processor, a parking space proximate at least one object;
determining, by the processor, a viability of the parking space based on the minimum egress space;
verifying, by the processor, that a distance between the vehicle and the at least one object is greater than the minimum egress space, when the vehicle is parked in the parking space; and
broadcasting, by the processor, the minimum egress space to be received by other vehicles.

8. The computer system of claim 7, wherein the calculating the minimum egress space comprises:
accessing, by the processor, a user profile stored on the computing system, in response to the identifying the user, the user profile including a historical average minimum egress space for the user, based on previous exits and entries of the user from the vehicle.

9. The computer system of claim 7, wherein the determining the viability of the parking space comprises:
obtaining, by the processor, a width of the parking space, the width of the parking space measured by at least one vehicle sensor positioned proximate a front end of the vehicle;
receiving, by the processor, a broadcasted signal from the at least one object, the broadcasted signal including data relating to an egress requirement of a parked vehicle adjacent to the parking space; and
analyzing, by the processor, the width of the parking space, a width of the vehicle, the minimum egress space of the user, and the data relating to an egress requirement of the parked vehicle, to determine the viability of the parking space;
wherein the viability of the parking space is determined as the vehicle approaches the parking space.

10. The computer system of claim 7, wherein, when the parking space is not viable, recommending, by the processor, that the user exit the vehicle, prior to the user attempting to park the vehicle.

11. The computer system of claim 7, further comprising: providing, by the processor, steering instructions to the user during a parking sequence so that the vehicle is optimally positioned within the parking space.

12. The computer system of claim 7, wherein the vehicle includes a self-driving feature, such that the vehicle automatically parks the vehicle, in response to the detecting the parking space and determining that the parking space is viable.

13. A computer program product, comprising a computer readable hardware storage device storing a computer readable program code, the computer readable program code comprising an algorithm that when executed by a computer processor of a computing system implements a method for assisting a parking of a vehicle based on a customized egress requirements, the method comprising:
identifying, by a processor of a computing system, a user entering the vehicle;
calculating, by the processor, a minimum egress space of the user, required for an egress of the user from the vehicle, wherein the calculating the minimum egress space comprises: processing, by the processor, a first data from at least one sensor of the vehicle coupled to the computing system, the at least one sensor measuring a door angle of a door of the vehicle as the user opens the door to enter the vehicle, and a second data received from at least one camera coupled to the computing system, the at least one camera capturing a buffer space between the user and a door frame of the vehicle as the user enters the vehicle;
detecting, by the processor, a parking space proximate at least one object;
determining, by the processor, a viability of the parking space based on the minimum egress space;
verifying, by the processor, that a distance between the vehicle and the at least one object is greater than the minimum egress space, when the vehicle is parked in the parking space; and
broadcasting, by the processor, the minimum egress space to be received by other vehicles.

14. The computer program product of claim 13, wherein the calculating the minimum egress space comprises:
accessing, by the processor, a user profile stored on the computing system, in response to the identifying the user, the user profile including a historical average minimum egress space for the user, based on previous exits and entries of the user from the vehicle.

15. The computer program product of claim 13, wherein the determining the viability of the parking space comprises:
obtaining, by the processor, a width of the parking space, the width of the parking space measured by at least one vehicle sensor positioned proximate a front end of the vehicle;
receiving, by the processor, a broadcasted signal from the at least one object, the broadcasted signal including data relating to an egress requirement of a parked vehicle adjacent to the parking space; and analyzing, by the processor, the width of the parking space, a width of the vehicle, the minimum egress space of the user, and the data relating to an egress requirement of the parked vehicle, to determine the viability of the parking space;

wherein the viability of the parking space is determined as the vehicle approaches the parking space.

16. The computer program product of claim 13, further comprising: providing, by the processor, steering instructions to the user during a parking sequence so that the vehicle is optimally positioned within the parking space.

17. The computer program product of claim 13, wherein the vehicle includes a self-driving feature, such that the vehicle automatically parks the vehicle, in response to the detecting the parking space and determining that the parking space is viable.

* * * * *